May 31, 1966  J. M. DAUBENSPECK  3,253,888
METHOD FOR PRODUCING TITANIUM DIOXIDE OF PIGMENT QUALITY
Filed April 3, 1963
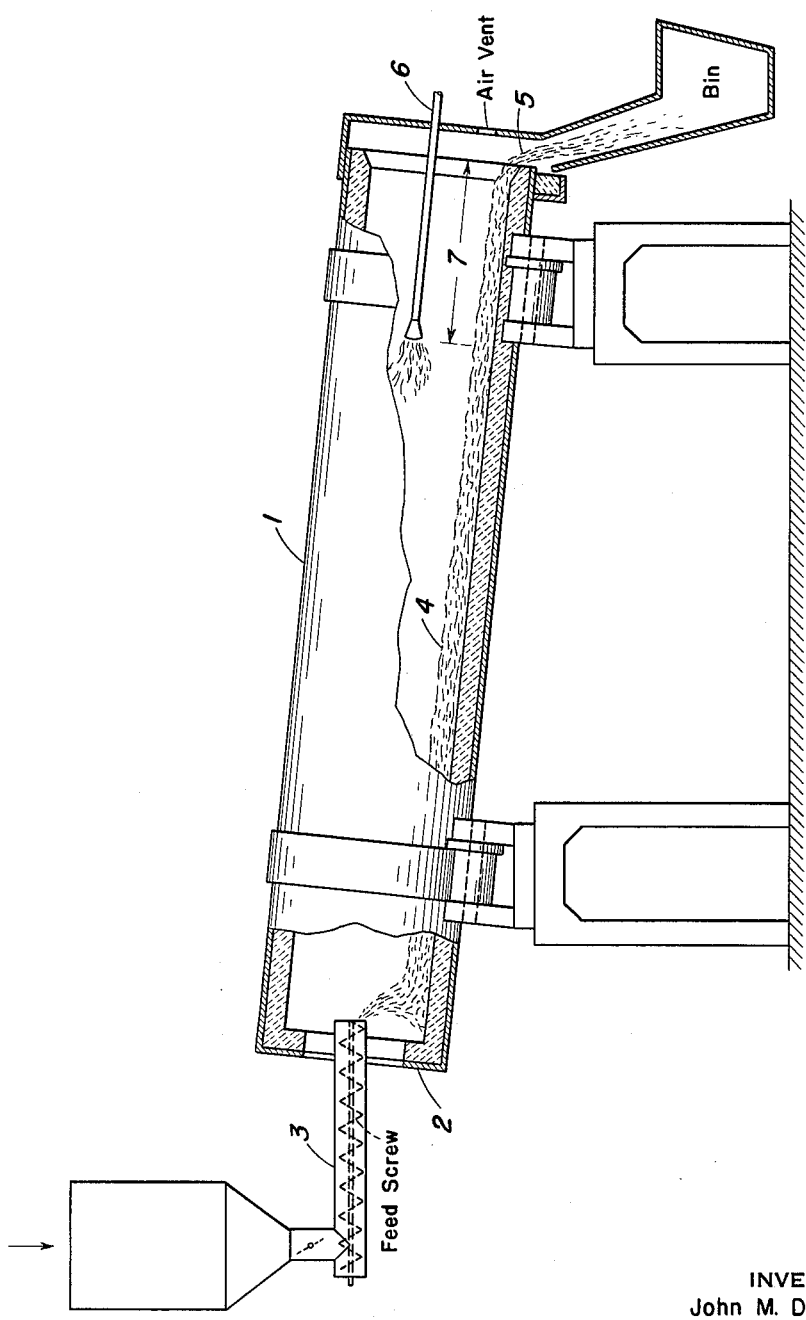
INVENTOR
John M. Daubenspeck
BY
*Robert L. Holiday*
AGENT United States Patent Office 3,253,888
Patented May 31, 1966

3,253,888
METHOD FOR PRODUCING TITANIUM DIOXIDE OF PIGMENT QUALITY
John M. Daubenspeck, Westfield, N.J., assignor to National Lead Company, New York, N.Y., a corporation of New Jersey
Filed Apr. 3, 1963, Ser. No. 270,398
3 Claims. (Cl. 23—202)

This invention relates to a method for producing titanium dioxide pigment having the crystal structure of rutile. More specifically it relates to a method for producing rutile pigment having improved brightness.

Titanium dioxide pigments have been produced for many years from various ore bodies of ilmenite located throughout the world. These ore bodies may be classified generally into two groups: (1) beach sands which are found in granular form usually mixed with large amounts of silica and (2) massive deposits which are usually mixed with various iron ores, such as magnetite and hematite. In the beach sand type of ore the ilmenite is easily separated from the silica by magnetic means. The ilmenite fraction in this ore body usually has been altered by the elements to form a weathered type of ilmenite structure. In the massive deposit type of ore body the ilmenite fraction may be removed from the iron ore and silicates by grinding, flotation and magnetic methods.

In general the weathered ilmenite fraction of beach sands contains larger amounts of impurities, such as chromium and vanadium, than the massive deposit type of ilmenite. These impurities degrade the color of titanium dioxide pigment.

Although titanium dioxide pigments have been made for many years from both types of ore, the quality of the pigments produced from massive ore deposits has steadily improved to the point that it is difficult to produce rutile pigment of the highest quality from the beach sand type of ore. It is believed that the presence of the relatively high amounts of chromium and vanadium in a weathered ilmenite is instrumental in lowering the brightness of the rutile pigment produced therefrom. Previous attempts to remove the chromium and vanadium values from these ores have failed to produce any significant improvement in brightness. Moreover, in addition to the weathered ilmenite ores the chromium and vanadium impurities also tend to concentrate in titanium-containing slags produced in ore smelting operations.

An object of the instant invention therefore is to provide a process for producing rutile pigment of high brightness from an ilmenite ore or slag containing relatively high amounts of chromium and vanadium. A further object is to provide a process for producing rutile pigment of high brightness from an ilmenite ore or slag containing relatively high amounts of chromium and vanadium values by rendering said chromium and vanadium values innocuous. These and other objects will become apparent from the following description of the instant invention.

Titanium dioxide pigments normally are prepared by digesting an ilmenite ore or slag in concentrated sulfuric acid, forming a sulfate solution by dissolving the digested material in aqueous media, hydrolyzing the solution to form a titanium hydrate, calcining the hydrate in a rotary kiln to a maximum temperature of 850° C. to 1050° C. and grinding the calcined material to form a product of pigment quality.

Broadly, the instant invention contemplates an improvement over the above described process which comprises producing a rutile pigment of improved brightness from a titanium hydrate containing high amounts of chromium and vanadium as impurities by calcining said titanium hydrate in a rotary kiln in which hot combustion gases are produced adjacent the discharge end thereof, maintaining the point of maximum calcination temperature within said kiln forwardly of the discharge end thereof; cooling the calcined rutile titanium dioxide in said kiln from said point of maximum calcination temperature to a lower temperature of about 700° C. at the rate of from 2 to 20° C. per minute by retaining said calcined pigment in said kiln during the cooling stage rearwardly of the point of maximum calcination temperature within said kiln; maintaining an atmosphere substantially free from said hot combustion gases over the calcined pigment during the cooling stage and discharging the cooled calcined rutile pigment from the discharge end of the kiln, thereby producing a rutile pigment of improved brightness.

In general color degrading impurities including iron values, are removed from titanium hydrate by a bleaching step in which the titanium hydrate is slurried with 10% to 20% sulfuric acid solution to which a metallic reducing agent, such as powdered aluminum metal or zinc dust, is added in an amount to reduce all the iron values to the ferrous state. The solubilized impurities are then removed from the titanium hydrate by thorough washing.

However, it has been found that when titanium hydrates contain relatively high quantities of vanadium and chromium values as impurities, that these impurities are not reduced to below 5 p.p.m. vanadium and 2 p.p.m. chromium even after bleaching. These quantities of vanadium and chromium values present in the hydrate when calcined produced titanium dioxide pigments of inferior quality with respect to its color brightness. If however titanium hydrates containing these high quantities of vanadium and chromium values are calcined in the manner covered by the instant invention, the pigment produced has high brightness values. Apparently the vanadium and chromium values in the hydrate are rendered innocuous in some manner during the calcination and cooling steps so that they do not adversely effect the brightness of the pigment produced.

For most effective results titanium hydrates which contain at least 5 p.p.m. vanadium and 2 p.p.m. chromium but not more than 15 p.p.m. vanadium and 10 p.p.m. chromium after bleaching are employed in the process of the instant invention.

The color brightness of the pigment produced is determined instrumentally by measuring the green reflectance of the pigment in a wet film of alkyd vehicle. The determination is made on a Colormaster differential colorimeter manufactured by Manufacturers Engineering and Equipment Corp., Hatboro, Pennsylvania.

The pigment is mixed with an alkyd vehicle to form a paste and the paste is applied to the surface of a high reflectance white ceramic panel, the thickness of the paste being sufficient to form a film which eliminates the background color. The green reflectance value of the film is read on the Colormaster and the reflectance is recorded as percent reflectance or brightness.

Titanium dioxide pigment material is usually produced commercially by calcining bleached titanium hydrate in a substantially horizontal rotary kiln or calciner. The titanium hydrate is fed into one end of the rotary kiln as a wet filter cake containing about 30–40% solids. The rotary calciner is raised slightly from the horizontal at the feed end of the kiln and the titanium hydrate is tumbled slowly along the length of the kiln to the lower end where it is discharged immediately from the kiln into a discharge chute. Located also at the discharge end of the kiln is a combustion chamber having a burner in which a fuel such as oil or gas is burned with air to form hot combustion gases in the combustion chamber which are passed through the kiln to supply sufficient heat to dehydrate the hydrate and form titanium dioxide of pigment quality in the calciner.

Titanium dioxide pigment material is very sensitive to slight variations in calcination temperatures and therefore it is necessary to obtain very close control of the maximum temperatures employed. The maximum temperature of calcination of titanium dioxide material lies within the range of 800° C. to 1050° C. depending upon the type of pigment desired. It may be necessary to regulate the maximum temperature of the titanium dioxide material to within a few degrees of temperature, say e.g., 10° C. in order to obtain optimum conditions of calcination for the pigment produced.

In commercial rotary calciners now used for the manufacture of titanium dioxide pigment, all of the heat employde in the kiln is obtained by burning fuel with air in the combustion chamber located at the discharge end of the kiln. All of the combustion gases are passed through the length of the kiln and the heat from these gases converts the hydrate to anhydrous $TiO_2$ which is calcined as it passes through the kiln to form $TiO_2$ pigment. The amount of heat required is regulated by the amount of fuel and air burned in the combustion chamber.

In all such calciners the pigment being calcined increases in temperature as it tumbles toward this discharge end of the kiln where it reaches its maximum temperature at the discharge end of the kiln. Upon discharging from the kiln into the discharge chute, the temperature of the pigment drops from its maximum calcination temperature to several hundred degrees less than the maximum calcination temperature over a period of a few minutes, the drop in temperature of the pigment being in excess of 100° C. per minute as it is discharged from the kiln into the discharge chute.

Calciner discharge containing appreciable amounts of chromium and vanadium and cooled rapidly, as in the foregoing manner, produces a finished pigment of low brightness.

However, it has now been discovered, in accordance with the process of the instant invention, that the deleterious effect of rapid cooling can be overcome by employing a controlled cooling technique wherein sufficient heat is provided in a rotary kiln to calcine the titanium dioxide material to its optimum calcination temperature; and the calcined material is cooled within the kiln at a controlled rate from its calcination temperature to 700° C. in the absence of hot combustion gases and before the calcined pigment is discharged from the kiln.

One modification of a rotary kiln design which is particularly satisfactory for carrying out the instant invention is shown in the accompanying schematic drawing.

Referring to the drawing, the modified kiln comprises an elongated steel cylindrical chamber 1 suitably mounted and rotated on trunnions in a substantially horizontal position. The cylindrical chamber of kiln is raised slightly at its feed end 2 so that titanium hydrate, added by means of a screw conveyor 3 at the raised end, forms a bed 4 in the kiln which tumbles slowly throughout the length of the kiln, the calcined pigment being removed from the kiln at the discharge end 5. A burner 6 is positioned inside the rotary kiln at a suitable distance from the discharge end of the kiln to provide a controlled cooling zone 7 near the discharge end of the kiln. The burner may burn either gas or oil and is adaped to produce a short flame which provides the hot combustion gases for dehydrating the titanium hydrate and calcining the resulting titanium dioxide pigment passing through the kiln. As shown in the drawing the short flame is positioned above the level of the pigment being calcined so that the flame does not directly touch the pigment, thereby preventing the flame from over heating the pigment.

In calcining the pigment the titanium hydrate is fed into the calciner by the screw conveyor. As it tumbles slowly through the calciner it is dehydrated to form titanium dioxide. The titanium dioxide is then calcined up to its optimum temperature, i.e., from 850° C. to 1050° C. by the time it reaches a position adjacent the flame in the calciner. Beyond this point the calcined pigment passes through a cooling zone within the kiln in which the removal of heat from the pigment is carefully controlled such that the temperature of the pigment is reduced from its maximum temperature to 700° C. at a cooling rate of from 2 to 20° C. per minute before being discharged from the kiln. During its passage through the cooling zone it is surrounded by an atmosphere substantially free from hot combustion gases. Air may be admitted at the discharge end of the kiln and passed over the pigment in the cooling zone if desired.

In order to illustrate more fully the process of the instant invention the following examples are presented:

*Example I*

A titanium hydrate containing 6.3 p.p.m. vanadium and 2.9 p.p.m. chromium which was prepared from an ilmenite ore concentrate was subjected to the following calcination process:

The titanium hydrate was added to a rotary calciner as a wet filter cake containing 38% solids at the rate of about 1.8 pounds per minute. The rotary calciner was 30 feet long and 3 feet in diameter. The calciner was rotated at 9.5 m.p.r. and 1.3 tons of rutile calcined pigment were produced per 24 hours. The retention time of the pigment being calcined in the kiln was 8 to 9 hours. 20 cubic feet per minute of natural gas at 15° C. were burned with air, in 100% excess of the theoretical amount to burn the natural gas, to produce a short flame in the discharge end of the kiln. This amount of burned fuel provided a sufficient quantity of heat in the kiln to dehydrate the titanium hydrate and to calcine the titanium dioxide to a maximum temperature of 895° C. at a point adjacent the burner flame. This maximum calcination temperature produced rutile pigment having desirable properties.

As the calcined pigment passed the point of maximum temperature, the calcined pigment was cooled from 895° C. to 550° C. at the rate of 2.8° C. per minute in the controlled cooling zone of the calciner which lies between the point of maximum temperature and the discharge end of the kiln, a distance of about 6 feet. The atmosphere in the cooling zone was kept substantially free from hot combustion gases.

After grinding the calcined pigment in the normal manner, the pigment had a brightness value of 95.4%.

In order to show the superiority of the pigment produced using the slow-cooling process of the instant invention over the rapidly-cooled pigment produced by the prior art processes, the same titanium hydrate was calcined in the normal manner, i.e., without slow-cooling in the kiln. This rapidly-cooled pigment produced for comparative purposes was visually inferior in color to the slow-cooled pigment of the instant invention, the brightness of the rapidly-cooled pigment being measured as 95.1%.

*Example II*

A titanium hydrate containing 8.4 p.p.m. vanadium and 2.9 p.p.m. chromium was prepared from a titanium-containing slag prepared by smelting an ilmenite ore. The titanium hydrate was calcined in the same manner as that described in Example I except that the maximum temperature of calcination was 915° C. and the rate of slow-cooling in the kiln was 3.5° C. per minute.

The brightness of the finished pigment was 96.0% while a control run which did not use the controlled cooling zone produced a pigment having an inferior color and a measured brightness of only 95.1%.

From the above description and by the examples presented it has clearly been shown that titanium dioxide pigment possessing high brightness may be produced from a titanium hydrate containing relatively high quantities of vanadium and chromium values. By using the process of the instant invention, the vanadium and chromium values are rendered innocuous during the controlled slow-cooling process, thereby producing pigment of superior quality. The process of the instant invention is easy and simple to operate and superior pigment products are produced over those obtained by using the prior art methods.

While this invention has been described and illustrated by the examples shown, it is not intended to be strictly limited thereto, and other variations and modifications may be employed within the scope of the following claims.

I claim:

1. In a method for the preparation of rutile pigment in which a titaniferous material containing relatively high amounts of chromium and vanadium as impurities is digested in sulfuric acid to form a titanium sulfate solution which is hydrolyzed to form a titanium hydrate, said hydrate after bleaching containing from 5 p.p.m. to 15 p.p.m. vanadium and from 2 p.p.m. to 10 p.p.m. chromium, calculated on a $TiO_2$ basis, said hydrate being calcined in a rotary kiln up to a maximum temperature which lies within the range of 850° C. to 1050° C. to form rutile titanium dioxide of pigment quality upon subsequent grinding, the improvement which comprises: calcining said titanium hydrate in a rotary kiln by feeding hot combustion gases into said kiln from the discharge end thereof; maintaining the point of maximum calcination temperature within the heated kiln forwardly of the discharge end thereof; cooling the calcined rutile titanium dioxide in said heated kiln from said point of maximum calcination temperature to a lower temperature of about 700° C. at the rate of from 2 to 20° C. per minute by retaining said calcined pigment in said heated kiln during the cooling stage rearwardly of the point of maximum calcination temperature within said kiln; maintaining an atmosphere substantially free from said hot combustion gases over the calcined pigment during the cooling stage and discharging the cooled calcined rutile pigment from the discharge end of the kiln, thereby producing a rutile pigment of improved brightness from a titanium hydrate containing high amounts of chromium and vanadium as impurities.

2. Method according to claim 1 in which an oxygen-containing atmosphere is maintained over the calcined pigment during the cooling stage.

3. Method according to claim 1 in which air is passed over the calcined pigment during the cooling stage.

No references cited.

BENJAMIN HENKIN, *Primary Examiner.*